United States Patent

[11] 3,588,169

| [72] | Inventor | Judith Lee Lunt<br>Salt Lake City, Utah |
|---|---|---|
| [21] | Appl. No. | 785,574 |
| [22] | Filed | Dec. 20, 1968 |
| [45] | Patented | June 28, 1971 |
| [73] | Assignees | C. Richard Barber<br>Salt Lake City, Utah ;<br>Charles S. Winn<br>Bountiful, Utah , a fractional part interest to each |

[54] WINDSHIELD PROTECTOR
5 Claims, 8 Drawing Figs.

[52] U.S. Cl. .................................................. 296/95, 160/368
[51] Int. Cl. .................................................. B60j 1/20
[50] Field of Search .......................................... 296/95, 97; 160/368, 368 (S), 387, 24; 150/52(.9)

[56] References Cited
UNITED STATES PATENTS

| 2,223,145 | 11/1940 | Wise | 180/368(S)UX |
| 2,823,746 | 2/1958 | Morgan | 295/95UX |
| 3,140,115 | 7/1964 | Bliss | 296/95 |

FOREIGN PATENTS

| 446,087 | 3/1968 | Switzerland | 296/95 |

*Primary Examiner*—Leo Friaglia
*Assistant Examiner*—John A. Pekar
*Attorney*—B. Deon Criddle ABSTRACT: A cover and anchors for use in protecting automobile windshields from ice, frost and snow accumulations. The anchors fit into a windshield molding to be secured in place and the cover, which is connected by springs to the anchors, is adjustable to fit any conventional windshield.

INVENTOR:
JUDITH LEE LUNT

BY: B. Dean Griddle

ATTORNEY.

PATENTED JUN 28 1971 3,588,169
SHEET 2 OF 2
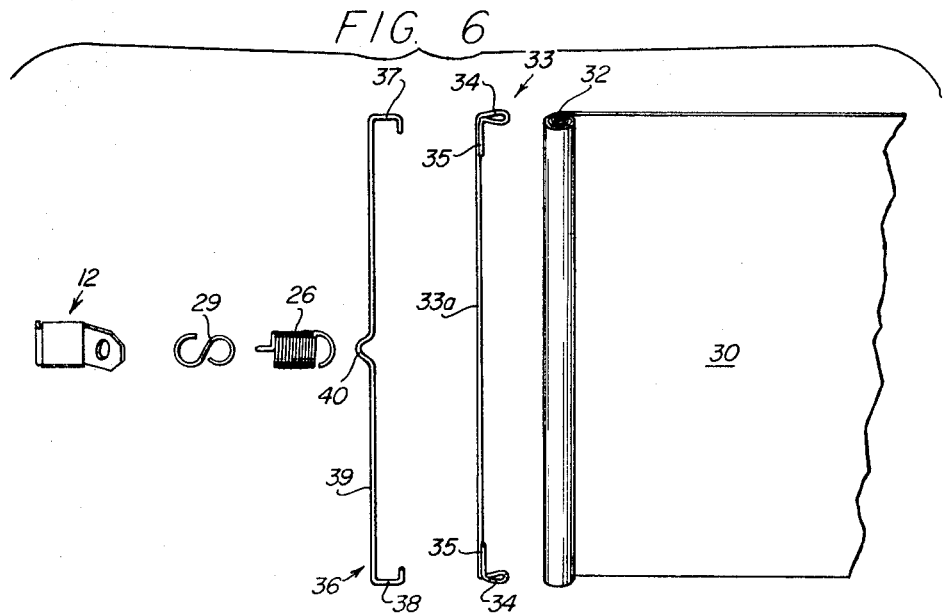
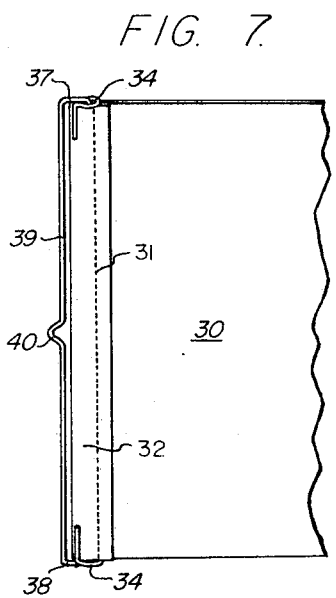
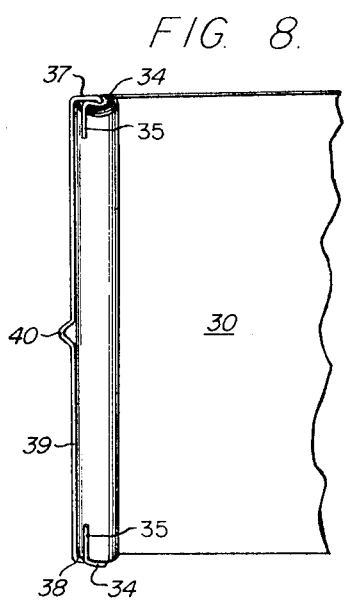
INVENTOR:
JUDITH LEE LUNT.
BY:
*B. Deon Criddle*
ATTORNEY 3,588,169

WINDSHIELD PROTECTOR

BRIEF DESCRIPTION OF THE INVENTION

In areas where the weather is such that freezing is common, many persons find it desirable to cover their automobile windshields whenever the vehicle must be left exposed to the weather and it is anticipated that frost, snow or ice will accumulate on the glass in the absence of such a cover.

A number of covers have been used in the past, but, so far as I am aware, none have been entirely satisfactory, and most persons desiring such a shield have merely used newspaper or such other sheet material as may have been available.

Commercially available covers with which I am familiar are difficult to handle and generally involve the tying of anchor ropes or strings to vehicle door handles or that magnets be used to hold the cover in place. When ropes or strings are used, it frequently becomes very difficult to tie and untie knots, especially if the rope or string is wet and cold. Magnets do not work satisfactorily in holding the covers against their being blown off in heavy winds.

Thus, it is a principal object of the present invention to provide a cover that is easily installed over a vehicle windshield and that can be easily removed, handled and stored even when wet and cold. Another object is to provide anchors for such a cover that are easily and permanently installed so that the cover can be readily attached thereto.

Principal features of the invention include anchors, which are made small enough to fit between the glass of a vehicle windshield and the molding that holds the windshield in place. A resilient sleeve on each anchor prevents breakage of the glass and forms a shoulder that will engage the molding and resist withdrawal of the anchor. The cover is made of impermeable, sheet material and preferably of a suitable plastic that will not harden and crack, even under extreme temperature conditions.

Additional objects and features of the invention will become apparent from the following detailed description and drawings, disclosing what is presently contemplated as being the best mode of the invention.

THE DRAWING

FIG. 1 is a perspective view, with an automobile shown fragmentarily and the windshield protector of the invention in position overlying the windshield;

FIG. 2, a greatly enlarged view of an anchor;

FIG. 3, an enlarged horizontal section taken on the line 3–3 of FIG. 1 and showing how an anchor is positioned between a windshield and the windshield molding;

FIG. 4, a front elevation view, partially broken away for clarity of the cover;

FIG. 5, a top plan view of the cover, showing one embodiment of cover attachments;

FIG. 6, an exploded, perspective view of another embodiment of cover attachment, with the cover shown fragmentarily;

FIG. 7, a fragmentary elevation view of the invention with the cover attachment of FIG. 6; and FIG. 8, a view like FIG. 7, but with the cover rolled to reduce its length.

DETAILED DESCRIPTION

Figure 1:
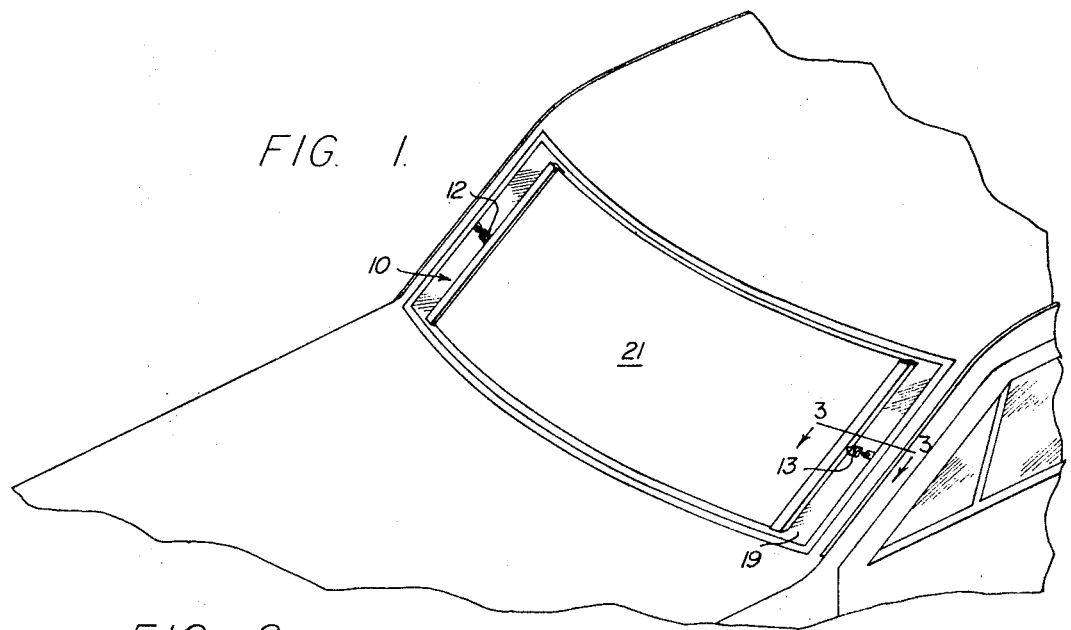
Figure 2:
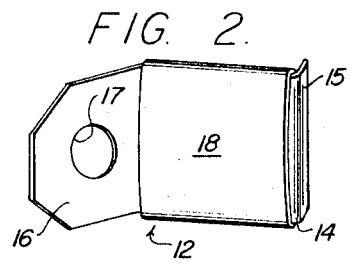
Figure 3:
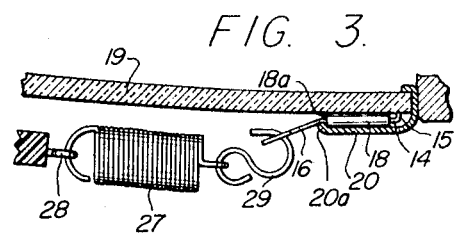
Figure 4:
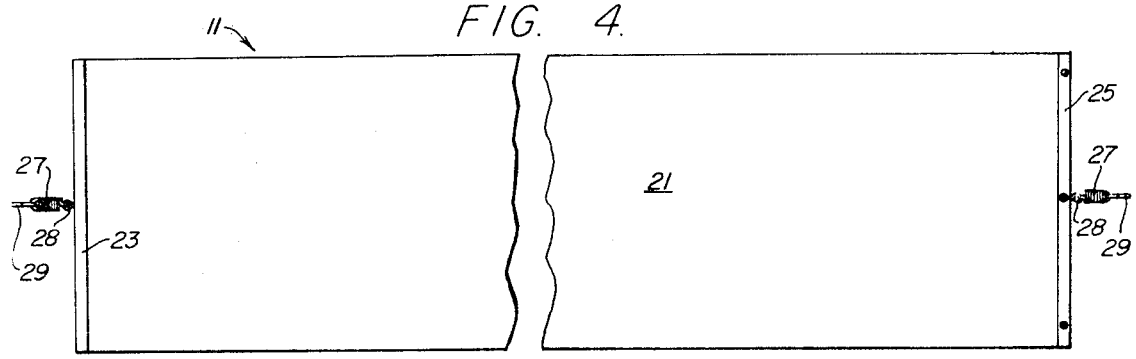
Figure 5:
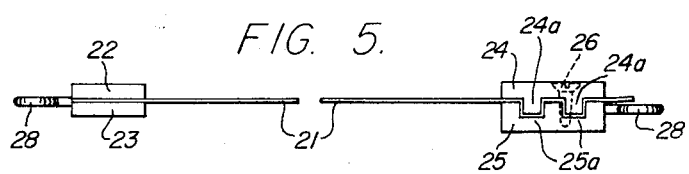

Referring now to the drawing:

In the illustrated preferred embodiment of FIGS. 1—5, the windshield protector, shown generally at 10, comprises a cover 11 and a pair of anchors 12 and 13.

Each anchor includes a straight body portion 14 that is bent at right angles at one end to form a small tab 15 and slightly in the opposite direction at the other end to form a projection 16 through which a hole 17 is formed to receive one end of an S-hook, as will be further explained.

A resilient sleeve 18 fits tightly over the body portion 14 to serve as a cushion against breakage of the windshield 19. The sleeve 18 also provides a shoulder 18a that will engage the inturned edge 20a of the molding 20 surrounding the windshield to hold it against its being pulled loose. Tab 15 holds the sleeve 18 on the body and also holds the anchor against the windshield molding so that the shoulder 18a of the anchor will be held against the inturned edge of the molding.

The screen portion 21 of cover 11 is made of a suitable impervious, flexible sheet material that is durable and that will not harden and crack even under extreme cold conditions. Because of their low cost and impermeability, cold-resistant plastic materials are presently preferred, but it should be apparent that other fabrics, such as canvas, could be used.

One end of the screen 21 is clamped between elongate strips 22 and 23 and is adhesively bonded thereto. The other end of the screen is clamped between elongate members 24 and 25. Member 24 is provided with projections 24a and member 25 is provided with recesses 25a to receive the projections 24a. Screws 26 are passed through holes provided therefor in member 24 and are tapped into member 25 to hold the members and the end of screen 21 clamped together as a sandwich.

By simply repositioning the clamped members 24 and 25, a user can readily change the length of the cover to fit any windshield.

Furthermore, even if the screen portion between the end strips 22 and 23 and the elongate members 24 and 25 is somewhat shorter than desired for full coverage of the windshield the cover can still be easily positioned since the springs 27 will stretch to allow the screen to be anchored.

The springs 27, connected to strip 22 and to member 24 by eye hooks 28 will stretch to allow S-hooks 29 on the free ends of the springs to be connected through the holes 17 of the anchors, which are securely anchored beneath the windshield molding as heretofore described, at each side of the windshield.

In removing the screen, the S-hooks are disconnected and the anchors are left in position ready for further use.

The screen is easily rolled around either the strips 22 and 23 or the members 24 and 25 and can be stored in a minimum of space.

In the embodiment shown in FIGS. 6—8, the anchors 12, hook 29, and spring 27 are constructed and arranged as previously described. However, the ends of screen 30, unlike the ends of the previously described screen 21 are not clamped between elongate strips. Rather, one or both ends of the screen material can be turned back and secured to the body of the screen as at 31 to form a loop 32.

A rod 33, made of stiff wire or the like, and having a straight body portion 33a with connector loops 34 formed at each end and extending normal to the elongate axis of the rod and an extension length 35 extending parallel to the elongate axis of the rod, is inserted through the loop 32. Each extension length 35 is then positioned exteriorly of the loop and a connector 36 is attached to the loops 34 of rod 32.

The connector 36 includes a pair of hooks 37 and 38 each adapted to interconnect with a loop 34 and an intermediate length 39, that joins the hooks 37 and 38 and that has a bend 40 at its center to serve as a spring connecting portion that will receive the end of spring 27.

Either or both the rod 33 and connector 36 may be flexible so that it can be deformed to facilitate assembly or disassembly, yet will resume its original shape.

When the unit is assembled, any pull exerted through spring 27 on connector 36 will be transmitted substantially equally through the entire length of the rod 33, thereby reducing the tendency of the material forming loop 32 to tear.

To change the length of the screen 30 so that it will fit any desired window, the connector 36 is disengaged from rod 30, the extension lengths 35 are positioned inside loop 32 and the screen is rolled on the rod until the desired length is achieved. Thereafter, the extension lengths 35 are moved to be outside the rolled material, as shown in FIG. 8, and the connector is again attached, ready for use.

Because the rolled material is clamped between rod 33 and the extension lengths 35, it does not unroll, even when the unit is not in use.

Obviously the rod 33 and connector 36 can be used at both ends of the screen, if suitable loops are provided therefor, or they can be used at one end only and other suitable holding means, such as the clamped members 24 and 25, previously described, can be used at the other end.

Because the loops 34 extend normal to the rod 33, they not only serve as means whereby the connector 36 is attached, but also keep the fabric from moving along the rod 33.

Although a preferred form of my invention has been herein disclosed, it is to be understood that the present disclosure is by way of example and that variations are possible, without departing from the subject matter coming within the scope of the following claims, which subject matter I regard as my invention.

I claim:

1. A windshield protector comprising:
   a pair of anchor means adapted to be inserted between the windshield and the windshield molding of an automobile and to be retained therein each of said anchor means including a resilient sleeve member surrounding a body portion and forming a shoulder which engages the molding and windshield glass to resist removal;
   a flexible, impervious screen; and
   means for releasably attaching said screen to the said anchor means at opposite sides of an automobile windshield, whereby the screen is stretched over and overlies the said windshield.

2. A windshield protector as in claim 1, wherein each anchor means further includes:
   a straight body portion having a bent portion extending normal to the body portion at one end thereof and an angled away connector portion extending from the body portion in an opposite direction at the other end; and
   an opening through the connector portion.

3. A windshield protector as in claim 2, wherein the means for attaching the screen to the anchor means comprises:
   clamp means at each end of the screen; and
   springs, each having one end connected to a clamp means and having their other ends adapted to be connected to the openings in the connector portions of the anchor means.

4. A windshield protector as in claim 3, wherein the clamp means comprises:
   a pair of strips adhesively bonded together with one end of the screen therebetween; and
   a pair of elongate members, one of which has projections and the other of which has recesses adapted to receive the projections, and means for releasably securing the said elongate members together, with the projections of one extending into the recesses of the other and with the other end of the screen therebetween.

5. A windshield protector as in claim 1, wherein the means for attaching the screen to the anchor means includes:
   a loop formed by and across one full end of the screen;
   a rod having a body portion in the loop and ends projecting from the loop to form connector loops extending normal to the body portion; and
   a connector, including hook means releasably connected to the connector loops and having a spring connecting portion midway between the said connector loops.